(12) United States Patent
Mandell et al.

(10) Patent No.: US 9,379,806 B1
(45) Date of Patent: Jun. 28, 2016

(54) EIRP-BASED BEAMFORMING

(71) Applicant: RKF Engineering Solutions, LLC, Washington, DC (US)

(72) Inventors: Michael Mandell, Farmington Hills, MI (US); Arnold Berman, Washington, DC (US); Jeffrey Freedman, Laurel, MD (US); Erik Halvorson, Vienna, VA (US)

(73) Assignee: RKF Engineering Solutions, LLC, Washington, DC (US)

( * ) Notice: Subject to any disclaimer, the term of this patent is extended or adjusted under 35 U.S.C. 154(b) by 819 days.

(21) Appl. No.: 13/690,848

(22) Filed: Nov. 30, 2012

Related U.S. Application Data

(60) Provisional application No. 61/565,207, filed on Nov. 30, 2011.

(51) Int. Cl.
*H04B 7/185* (2006.01)
*H01Q 3/40* (2006.01)

(52) U.S. Cl.
CPC .......... *H04B 7/18519* (2013.01); *H01Q 3/40* (2013.01); *H04B 7/185* (2013.01); *H04B 7/18513* (2013.01); *H04B 7/18543* (2013.01)

(58) Field of Classification Search
CPC .. H04B 7/18543; H04B 7/2041; H04B 7/185; H01Q 25/002
USPC ........................................................ 342/354
See application file for complete search history.

(56) References Cited

U.S. PATENT DOCUMENTS

| | | | | |
|---|---|---|---|---|
| 4,689,625 | A * | 8/1987 | Barmat ................ | H04B 7/2041 342/353 |
| 5,754,942 | A * | 5/1998 | Wachs .................. | G01R 19/25 455/13.4 |
| 5,929,809 | A * | 7/1999 | Erlick .................... | H01Q 3/267 342/174 |
| 5,955,917 | A * | 9/1999 | Mandell ................ | H03F 1/3247 330/129 |
| 6,233,433 | B1 * | 5/2001 | Norin .................. | H04B 7/18519 455/13.3 |
| 8,193,975 | B2 * | 6/2012 | Zheng .................. | H01Q 3/2605 342/354 |
| 2003/0058165 | A1 * | 3/2003 | Li .......................... | H01Q 21/00 342/360 |
| 2009/0231187 | A1 * | 9/2009 | Churan ................ | H04B 7/2041 342/352 |
| 2010/0194629 | A1 * | 8/2010 | Craig .................... | H01Q 1/288 342/354 |

* cited by examiner

*Primary Examiner* — Gregory C Issing
(74) *Attorney, Agent, or Firm* — Fish & Richardson, P.C.

(57) ABSTRACT

In one implementation, a minimum metric function with an output representing a metric of a satisfaction of transmission requirements for a satellite communications system configured to produce at least two beams may be generated. The minimum metric function may be a function of beam weight parameters including a first and second set of beam weight parameters representing output signals of high power amplifiers used to form a first and second beam, respectively. An output value of the minimum metric function may be calculated using initial values for the beam weight parameters. A direction to modify the values of the beam weight parameters may be determined based on the calculated output value. Updated values of the beam weight parameters may be determined based on maximizing the output value of the minimum metric function by moving the values of the beam weight parameters in the determined direction.

24 Claims, 8 Drawing Sheets

EIRP-BASED BEAMFORMING

CROSS-REFERENCE TO RELATED APPLICATIONS

This application claims priority to U.S. Provisional Application No. 61/565,207 filed on Nov. 30, 2011 and titled "EIRP-BASED BEAM-FORMING ALGORITHM AND SYSTEM," which is incorporated herein by reference in its entirety.

TECHNICAL FIELD

The following disclosure relates generally to a beamforming satellite communications system.

BACKGROUND

Some satellite communications systems provide multiple beams that connect diverse terrestrial regions through a satellite. In this context, a satellite may use multiple radiating elements, which are also known as feeds, in a phased array or as part of a reflector antenna, to form one or more communication beams for communicating with terrestrial devices in the coverage areas of the communication beams. A satellite communications system may combine an array of radiating elements or feeds coherently to create one or more discrete beam shapes. Beams that are designed to cover a relatively small geographical area are often referred to as spot beams, and beams that are designed to cover a relatively larger geographical area are often referred to as regional beams.

Formation of beams may be accomplished by adjusting the relative phase and/or gain of each signal path routed to each element in order to create the desired beam pattern. The adjustments to each signal path may be determined based on determining the desired output out of each radiating element and then determining the adjustments to the relative phase and/or gain of each signal path necessary to produce the desired output.

BRIEF DESCRIPTION OF THE FIGURES

Like reference symbols in the various drawings indicate like elements.

DETAILED DESCRIPTION

Figure 1:
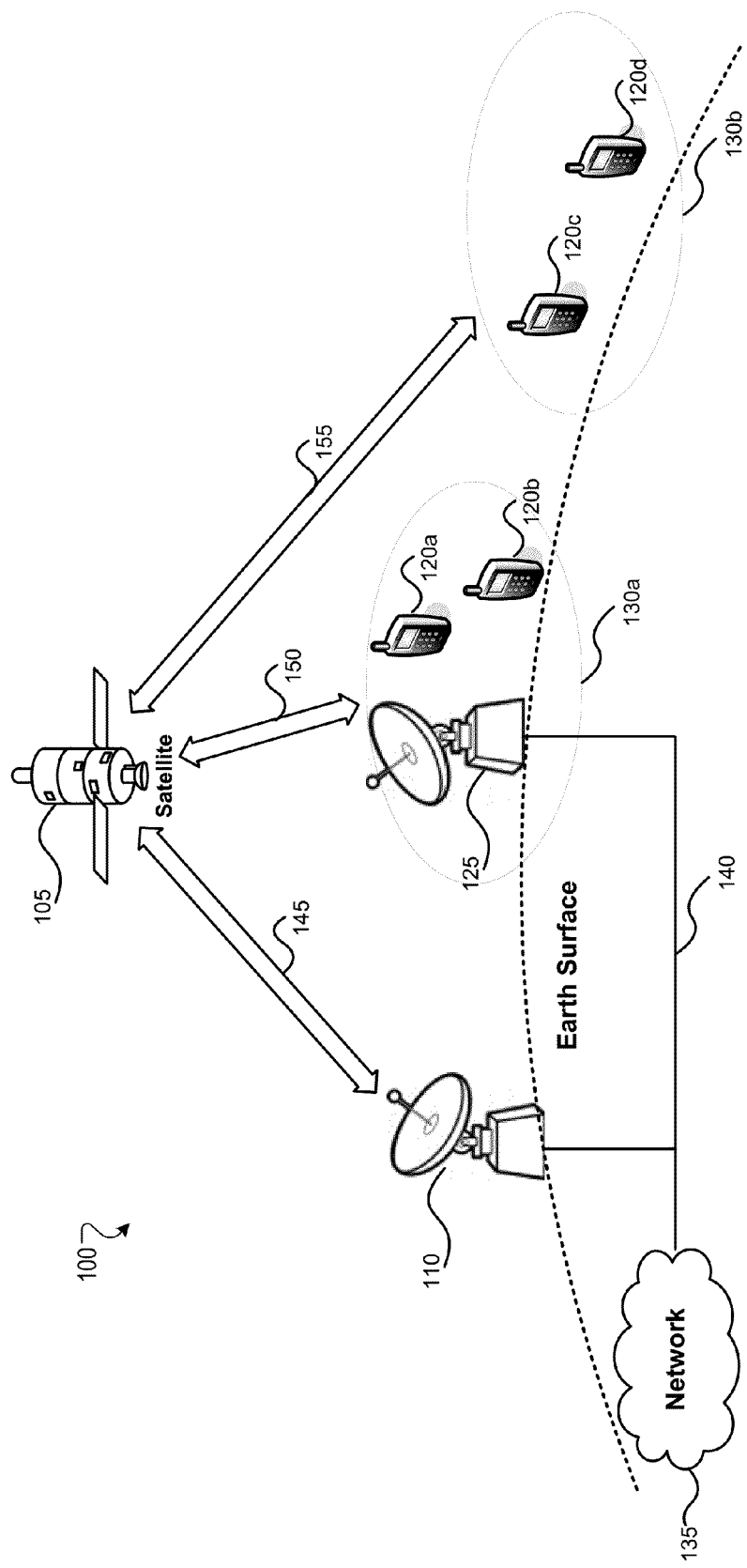
FIG. 1 illustrates an example satellite system that is used for beamforming.

A beam may be defined by a set of complex weights applied across radiating elements of a satellite. The set of complex weights applied across the radiating elements may also be referred to as radiating element beam weights. The radiating element beam weights may be determined based on satisfying a required minimum average power over a region covered by the beam. For a given beam, each radiating element may, for example, be assigned its own radiating element beam weight such that energy at a given beam frequency that is radiated by the element will have the proper relative phase and relative magnitude to coherently combine with other energy radiated by other radiating elements to form the particular beam. In some implementations, the radiating element beam weight may be expressed as a complex number that indicates an amplitude and phase of the signal radiated by the corresponding radiating element.

A satellite may form more than one beam. When beamforming, the radiating element beam weights may be determined individually for each beam without regard to other beams. However, the radiating element beam weights determined for a first beam may be incompatible with the radiating element beam weights determined for a second beam. For example, formation of each beam may use a high power amplifier (HPA) that has a saturation point. The saturation point of the HPA may specify the maximum power the HPA may output before performance of the HPA is degraded. However, the saturation point of the HPA may be below the power output required to satisfy both the determined radiating element beam weights for the first beam and the determined radiating element beam weights for the second beam.

For example, an HPA may have a saturation point of 100 W, but the determined radiating element beam weights for the first beam may require a power output of 70 W from the HPA and the determined radiating element beam weights for the second beam may require a power output of 80 W from the HPA. Accordingly, the total power output from the HPA based on the two sets of beam weights would be 150 W, greater than the HPA's saturation point of 100 W.

Instead of being defined by radiating element beam weights, the beam may be defined by a set of complex weights applied across the outputs of the HPAs of a satellite. The set of complex weights applied across the outputs of the HPAs of a satellite may also be referred to as HPA beam weights. In contrast to the radiating element beam weights, the values of the HPA beam weights may specify the amplitude and phase of the output of each HPA for each beam. For example, if there are three beams formed using ten HPAs, the HPA beam weights may be represented by a ten row by three column matrix, where the rows represent the HPAs and the columns represent the beams. Notably, while the radiating element beam weights specify the amplitude and phase of the signals outputted by the radiating elements of the satellite, the HPA beam weights, in contrast, specify the amplitude and phase of the signals outputted by the HPAs of the satellite.

The advantage of defining beams using HPA beam weights may be that the direct determination of HPA beam weights may take into consideration all beams by applying the saturation points of HPAs as a mathematical constraint directly on the HPA beam weights. Further, directly determining HPA beam weights may enable additional transmission requirements to be specified. The following description may refer to HPA beam weights as simply beam weights.

FIG. 1 illustrates an exemplary satellite system 100 that is used for beamforming. The satellite system 100 includes a satellite 105 connected through satellite channels to gateways 110 and 125, and user terminals 120*a*, 120*b*, 120*c* and 120*d*, which are located on the surface of the Earth. The satellite 105 transmits data to and receives data from the gateways 110, 125, and user terminals 120*a*, 120*b*, 120*c* and 120*d*. Gateway 125 and user terminals 120*a* and 120*b* are within formed beam coverage area 130a. User terminals 120d and 120e are within formed beam coverage area 130b. That is, gateway 125 and user terminals 120a-120b are located within the geographic extent covered by beam 130a, while user terminals 120d-120e are located within the geographic extent covered by beam 130b. The gateways 110 and 125 are terrestrially connected to each other and to a terrestrial network 135 through communications link 140.

The satellite 105 may be located at a geostationary orbital location defined by a longitude. Alternatively, the satellite 105 may be located at a different orbital location, for example, a medium earth orbit or a low earth orbit. While only a single satellite 105 is shown, a plurality of satellites may be used. The satellite 105 interconnects the gateway 110, the gateway 125 and user terminals 120a, 120b in beam 130a, and the user terminals 120c, 120d in beam 130b, through satellite communications channels. While only two gateways 110 and 125 are shown, a plurality of gateways may be employed. Similarly, more than two beams may be employed, and any number of user terminals may be used distributed amongst a plurality of beam coverage areas. A beam may include one or more gateways (e.g., beam 130a), or a beam may include zero gateways (e.g., 130b).

The satellite 105 may be a bent-pipe satellite that retransmits a received signal, or alternatively, may perform switching of the signals among the formed beams. The satellite 105 may include multiple radiating elements or feeds to enable transmission of information in both directions from the satellite 105 to the gateways or user terminals. The feeds transmit signals to or receive signals from the gateways 110, 125 and the user terminals 120a-120d.

A subset of the radiating elements or feeds in the satellite 105 may be used for transmission in the forward direction from the satellite 105 to the gateways 110 and 125, and the user terminals 120a-120d. These elements are referred to as the forward link elements or forward link feeds. The remaining elements may be used for transmission in the return direction from the gateways 110, 125 and the user terminals 120a-120d to the satellite 105. These elements are referred to as the return link elements, return link feeds, receiving elements or receiving feeds. Each forward link element or return link element may be assigned its own unique channel (consisting of frequency and/or polarization) for communicating with a gateway. The channel assigned to an element may not be shared with any other element. Each element also may have its own distinct radiation pattern that may be different from the radiation pattern associated with any other element.

The gateways 110 and 125 are coupled to the network 135 through a communications link 140. The network 135 may be a non-public data network, a public data network or a combination of public and non-public data networks, e.g., the Internet. The communications channel 140 may be a high-speed terrestrial connection, such as an optical connection with data rates in the range of gigabits per second. In an alternative implementation, the communications channel 140 also may be a satellite communications channel through a satellite that is different from the satellite 105.

The gateways 110 and 125 may include one or more modules that process signals exchanged with the satellite elements for beamforming. The gateways 110 and 125 may transmit signals to the satellite over the satellite return links for phase and/or gain calibration for the return link. The gateways 110 and 125 also may receive signals from the satellite over the satellite forward links for phase and/or gain calibration for the forward link. The signals used for phase and/or gain calibration may include unique code words that identify such signals as being configured for phase and/or gain calibration. The gain and/or phase measurement data for the received or transmitted signals may be communicated to the gateways 110 and 125 over the communications link 140. The measurement data may be used to enable calibration and/or satellite pointing correction. The communications link 140 may be part of a closed network accessible only to components of the satellite communications system 100, or may be part of an open network that connects the gateway 110 to the network 135.

The user terminals 120a-120d are computing devices able to communicate data to and from the satellite 105 over a satellite link. For example, the user terminals 120a-120d may be handheld mobile telephones or car phones, laptop personal computers, desktop personal computers, and/or geographically fixed phone booths. The user terminals in separate satellite coverage areas serviced by different formed beams communicate with each other and with the gateways 110 and 125 over the satellite 105 via the satellite links 145, 150 and 155. Each satellite link 145, 150 or 155 includes both an uplink to the satellite 105 and a downlink from the satellite 105.

Figure 2:
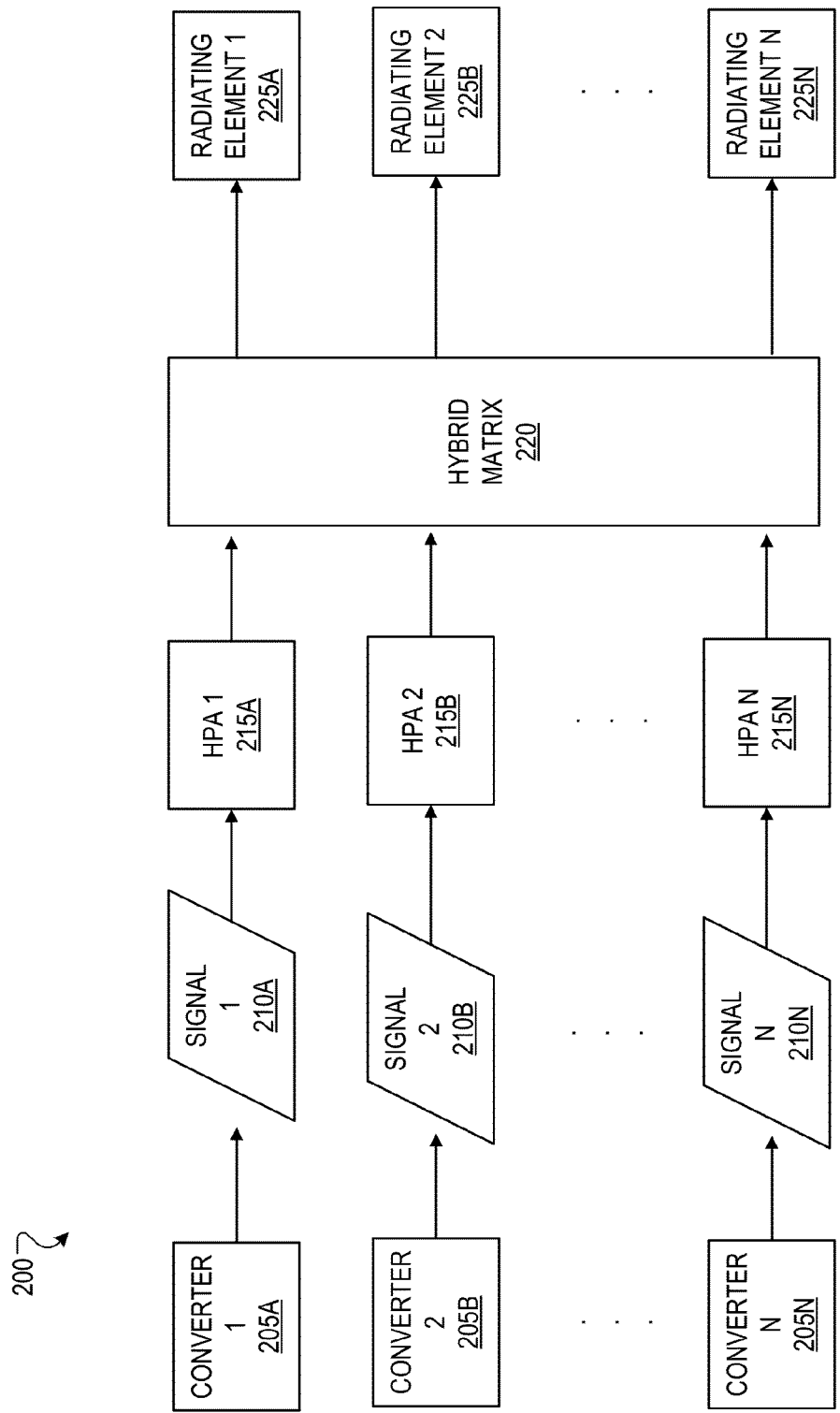
FIG. 2 shows an architecture of an example satellite used for beamforming.

FIG. 2 shows an architecture 200 of an example satellite 105 used for beamforming. The architecture may include converters 205A-205N providing analog signals 210A-210N to HPAs 215A-215N. The HPAs 215A-215N may be connected to a hybrid matrix 220. The hybrid matrix 220 may be connected to radiating elements 225A-225N.

The converters 205A-205N may be digital signal to analog signal converters. The converters 205A-205N may receive digital signals and convert these digital signals to analog signals 210A-210N. For example, the converters 205A-205N may convert a binary signal into a continuous signal. The digital signals may be signals received from the gateways 110 and 125. During the conversion process, the converters 205A-205N may filter the digital signal and perform interpolation on the digital signal.

The HPAs 215A-215 N may increase the power of the analog signals 210A-210N received from the output of the converters 205A-205N. The HPAs 215A-215N may receive the signals 210A-210N as inputs, amplify the signals 210A-210N, and output the amplified signals. The HPAs 215A-215N may amplify the analog signals 210A-210N by maintaining a shape of the analog signals 210A-210N but increasing the amplitude of the analog signals 210A-210N. For example, HPAs 215A-215N may receive an analog signal of $\sin\theta$ and output a signal of $2*\sin\theta$. The HPAs 215A-215N may apply a phase change to the analog signals 210A-210N. For example, HPA 215A may output a signal with a phase change of thirty degrees from the analog signal 210A input into HPA 215A. However, HPAs 215A-215N may be designed to minimize different phase changes and delays.

The hybrid matrix 220 may receive the outputs of the HPAs 215A-215N and distribute the received outputs to the radiating elements 225A-225N. For example, the hybrid matrix may receive eight amplified signals as inputs and split each amplified signal evenly among eight radiating elements 225A-225N. The hybrid matrix 220 may map the inputs and outputs based on a feed map. The feed map may describe which outputs from hybrid matrix 220 are connected to which inputs to the radiating elements 225A-225N.

For example, if the satellite has sixteen HPAs, two eight by eight hybrid matrices (which together form the hybrid matrix 220), and sixteen radiating elements, the feed map may be represented as a matrix having sixteen columns representing hybrid matrix outputs and sixteen rows representing radiating elements, and may include a one in a given array element if there is a connection between a corresponding hybrid matrix output port and a corresponding radiating element and a zero if there is no connection. The hybrid matrix representing the two eight by eight hybrid matrices may be represented by:

$$H = (1/sqrt(8)) * \begin{bmatrix} +1 & -j & -j & -1 & -j & -1 & -1 & +j & 0 & 0 & 0 & 0 & 0 & 0 & 0 & 0 \\ -j & -1 & -1 & +j & +1 & -j & -j & -1 & 0 & 0 & 0 & 0 & 0 & 0 & 0 & 0 \\ -j & -1 & +1 & -j & -1 & +j & -j & -1 & 0 & 0 & 0 & 0 & 0 & 0 & 0 & 0 \\ -1 & +j & -j & -1 & -j & -1 & +1 & -j & 0 & 0 & 0 & 0 & 0 & 0 & 0 & 0 \\ -j & +1 & -1 & -j & -1 & -j & +j & -1 & 0 & 0 & 0 & 0 & 0 & 0 & 0 & 0 \\ -1 & -j & +j & -1 & -j & +1 & -1 & -j & 0 & 0 & 0 & 0 & 0 & 0 & 0 & 0 \\ -1 & -j & -j & +1 & +j & -1 & -1 & -j & 0 & 0 & 0 & 0 & 0 & 0 & 0 & 0 \\ +j & -1 & -1 & -j & -1 & -j & -j & +1 & 0 & 0 & 0 & 0 & 0 & 0 & 0 & 0 \\ 0 & 0 & 0 & 0 & 0 & 0 & 0 & 0 & +1 & -j & -j & -1 & -j & -1 & -1 & +j \\ 0 & 0 & 0 & 0 & 0 & 0 & 0 & 0 & -j & -1 & -1 & +j & +1 & -j & -j & -1 \\ 0 & 0 & 0 & 0 & 0 & 0 & 0 & 0 & -j & -1 & +1 & -j & -1 & +j & -j & -1 \\ 0 & 0 & 0 & 0 & 0 & 0 & 0 & 0 & -1 & +j & -j & -1 & -j & -1 & +1 & -j \\ 0 & 0 & 0 & 0 & 0 & 0 & 0 & 0 & -j & +1 & -1 & -j & -1 & -j & +j & -1 \\ 0 & 0 & 0 & 0 & 0 & 0 & 0 & 0 & -1 & -j & +j & -1 & -j & +1 & -1 & -j \\ 0 & 0 & 0 & 0 & 0 & 0 & 0 & 0 & -1 & -j & -j & +1 & +j & -1 & -1 & -j \\ 0 & 0 & 0 & 0 & 0 & 0 & 0 & 0 & +j & -1 & -1 & -j & -1 & -j & -j & +1 \end{bmatrix}$$

The radiating elements 225A-225N may receive signals from the hybrid matrix 220 and may emit energy based on the signals. A radiating element or feed may refer to either a physical or a logical radiating structure on the satellite that is capable of emitting and/or receiving energy, e.g., in the radio frequency (RF) range. The energies from the different radiating elements 225A-225N may constructively and destructively interfere to form the beams. For example, a beam may be formed based on constructive and destructive interference of energy from three radiating elements. The radiating elements 225A-225N may also use energy with different center frequencies for different beams to minimize unwanted interference between beams.

Alternate architectures to architecture 200 may also be used. For example, the analog signal 210A-210N output from converters 205A-205N may undergo frequency translation, e.g., shifted in frequency to a desired operating frequency, before being received by the HPAs 215A-215N. In another example, the satellite 105 may be analog based so that the satellite 105 does not include digital to analog converters 205A-N. For example, the satellite 105 may receive analog signals 210A-210N from ground station 110.

Figure 3:
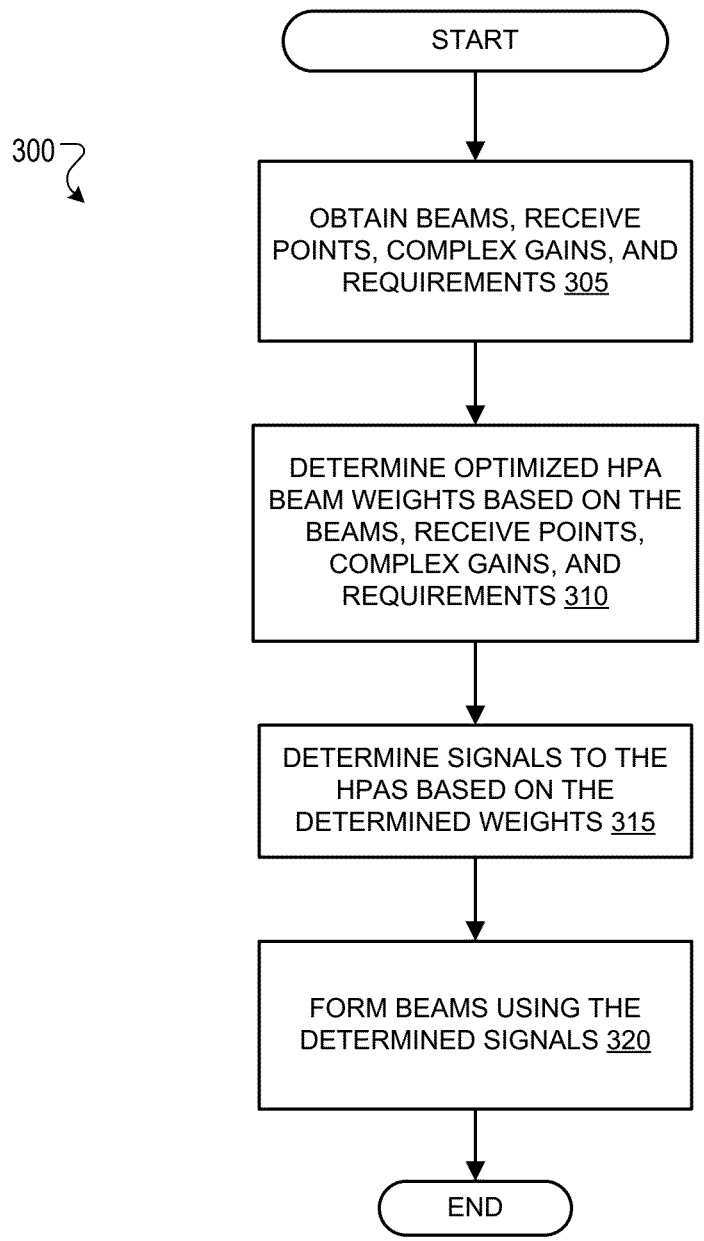
FIG. 3 is a flowchart illustrating an example of a process for beamforming.

FIG. 3 is a flowchart illustrating an example of a process for beamforming. The process 300 may be performed by components of the satellite system 100. For example, the process 300 may be performed by the gateways 110 or 125, satellite 105, or a combination. The following describes the process 300 as being performed by components of the system 100. However, the process 300 may be performed by other systems or system configurations.

When designing a satellite communications system, transmission requirements may be set forth by the designer that set forth desired power and interference constraints that need to be met by the system to achieve a desired performance. For example, the transmission requirements may specify a required equivalent isotropically radiated power (EIRP). EIRP may be the amount of power that a theoretical isotropic antenna (which evenly distributes power in all directions) would emit to produce the peak power density observed in the direction of maximum antenna gain. The required EIRP may include three types of requirements.

First, the required EIRP may specify a required minimum EIRP for a receive point for a beam. A receive point may be a particular geographic point, for example, a geographic point specified by a longitude and a latitude. EIRP for a receive point for a beam may be the EIRP corresponding to the beam observed at the receive point. Accordingly, the required minimum EIRP for a receive point for a beam may specify a minimum EIRP corresponding to the beam observed at the receive point. For example, the required minimum EIRP for a receive point for a beam may specify that a longitude and latitude in Los Angeles, Calif. must observe a signal of at least 10 W for the beam.

Second, the required EIRP may specify a required maximum co-channel interference EIRP for a receive point for a beam. The co-channel interference EIRP for a receive point for a beam may represent the sum of EIRPs observed at the receive point from all other beams sharing the same frequency as the beam. For example, the co-channel interference EIRP for a receive point for a beam may specify that for a longitude and latitude in Los Angeles, Calif., the sum of the EIRPs for observed signals from all other beams sharing the same frequency as the beam must be less than 2 W.

Third, the required EIRP may specify a required maximum interference EIRP for EIRP in an interference zone. The interference zone may be a geographic point that is not associated with a beam. The required maximum interference EIRP for EIRP in an interference zone may represent the sum of the EIRPs for all beams having a central frequency within a given predetermined set or list of frequencies observed at a receive point. For example, the required EIRP specifying a required maximum interference EIRP may specify that the sum of the EIRPs for observed signals from all beams having central frequencies between 10 GHz and 20 GHz for a longitude and latitude in Death Valley, Calif. must be less than 2 W.

Another transmission requirement may be an amplifier constraint. The amplifier constraint may be the saturation point of a HPA. For example, the amplifier constraint may specify that the output power of a given amplifier may only reach 100 W when 100 W is the saturation point of the amplifier.

The outputs of the HPAs may experience complex gains starting from the outputs of the HPAs to the observed signals at the receive points. The complex gain may represent a change in amplitude and phase imparted to the HPA output signal by the hybrid matrix 220 and the radiating elements 225A-225N. For example, if a HPA outputs a 20 W signal at a zero degree phase and the observed signal at a receive point from the output of the HPA is a 10 W signal at a thirty degree phase, then the complex gain starting from the output of the HPA to the observed signal at the receive point may be equivalent to halving the power of the output signal of the HPA and shifting the output signal of the HPA by thirty degrees.

Each combination of a HPA and a receive point may have an associated complex gain that represents the modification of the output signal of the HPA to take into account the change in its amplitude and phase (and, hence, power) that occurs as a result of the HPA output signal being transmitted from the output of the HPA through the satellite and to the receive point on Earth. For example, the complex gains for the outputs of five HPAs to ten receive points may be a ten row by five column matrix, where the columns represent the HPAs and the rows represent the receive points. The complex gain may be known and fixed based on the operating characteristics of the radiating elements 225A-225N (i.e., the gain patterns of each radiating element), the feedmap matrix, and the hybrid matrices.

The gateway 110 may obtain the number of beams to be generated, the receive points associated with the beams, the complex gain from the outputs of the HPAs to the receive points, and the transmission requirements (305). The information may be obtained from various sources. For example, a user may manually input a portion or all of the information via a user interface. Alternatively, the user may direct the gateway 110 to obtain a portion or all of the information from another source, e.g., a database. The gateway 110 may also obtain a portion or all of the information by determining the information itself. For example, the gateway 110 may determine the complex gain from an output of a HPA to a receive point based on calculating the actual observed EIRP at a receive point based on a known output from the HPA.

The gateway 110 may determine optimized HPA beam weights based on the obtained number of beams, the obtained receive points associated with the beams, the obtained complex gain from the outputs of the HPAs to the receive points, and the obtained transmission requirements (310). The optimized HPA beam weights may be beam weights that result in the satisfaction of all the transmission requirements given the beam, receive points, and complex gains. The optimized HPA beam weights may have a one-to-one correspondence with radiating element beam weights, meaning that the optimized HPA beam weights may be converted to radiating element beam weights by multiplication of the hybrid matrices and the feedmap matrix. Inversely, radiating element beam weights may be converted to HPA beam weights by multiplication of the inverse feedmap matrix and inverse hybrid matrices.

The gateway 110 may determine signals to the HPAs based on the determined weights (315). The gateway 110 may determine the signals by altering the digital signal that the satellite 105 converts based on the determined weights. The gateway 110 may alter the digital signal the satellite 105 converts by altering a digital signal provided to the satellite 105 where the altering is based on the determined weights.

For example, if the gateway 110 determines that the output from HPA 215A should be increased from 5 W to 10 W based on the weights, the gateway 110 may alter a digital signal provided to the satellite 105 from a first signal that would have resulted in the HPA 215A outputting 5 W to a second signal that results in the HPA 215A outputting 10 W. Alternatively, the gateway 110 may provide information to satellite 105 based on the optimized HPA beam weights so that the satellite 105 may determine a digital signal by altering an unaltered digital signal received from the gateway 110.

The satellite 105 may form the beams using the determined signals (320). The determined signals may ensure that the outputs of the HPAs 215A-215N match the values of the optimized HPA beam weights. In the case where the satellite 105 receives information from the gateway 110 to alter an unaltered signal to generate the determined signal, satellite may alter the digital signal prior to converting the digital signal to an analog signal or alter the analog signal after the digital system is converted but before the analog signal is amplified by the HPAs 215A-215N.

A mathematical example for the process 300 is described below where a satellite includes a bank of HPA's connected to hybrid matrices. The hybrid matrices are then connected to a set of radiating elements.

Let numHPA=Number of HPA's numFeed=Number of radiating elements.

In this analysis HPA's are indexed from 0 to numHPA−1, and radiating elements are indexed from 0 to numFeed−1. The HPA beam weights may be directly correlated with the radiating element beam weights. HPA beam weights may be converted to radiating element beam weights by multiplication of the hybrid matrices and feedmap matrix. Inversely, radiating element beam weights may be converted to HPA beam weights by multiplication of the inverse feedmap matrix and inverse hybrid matrices.

Let $x$[hpaIdx][beamIdx]=complex beam weight for beam beamIdx and HPA hpaIdx.

x[hpaIdx][beamIdx] may represent the set of unknowns to be solved for. A set of receive points (Rx points) may be defined over which the process 300 is performed.

The complex gains may be defined by the array W with elements w[hpaIdx][rxIdx] to be:

$w$[hpaIdx][rxIdx]=complex gain from HPA hpaIdx in the direction of Rx point rxIdx The matrix W may be computed directly from the individual gain patterns of each radiating element, the feedmap, and hybrid matrices. The matrix W may be known and fixed for a particular satellite. Each beam may have a corresponding frequency or color which may be given by freq[beamIdx]. The frequency assigned to each beam may be known and fixed for the EIRP-based beamforming algorithm.

Given an arbitrary set of HPA beam weights x[hpaIdx][beamIdx], the transmitted signal for beam beamIdx in the direction for Rx point rxIdx may be $$R[beamIdx][rxIdx] = \sum_{hpaIdx=0}^{numMPA-1} w[hpaIdx][rxIdx] * x[hpaIdx][beamIdx] \quad [1]$$

The EIRP transmitted in the direction of Rx point rxIdx for beam beamIdx may then be $$EIRP[beamIdx][rxIdx] = |R[beamIdx][rxIdx]|^2. \quad [2]$$

For each Rx point in a beam, a target signal EIRP and a target co-channel interference EIRP may be specified. For each Rx point in an interference zone, a target interference EIRP may specified. Let reqSIGEIRP[rxIdx]=required signal EIRP for Rx point in a beam.

reqINTEIRP[rxIdx]=required co-channel interference EIRP for Rx point in a beam, or required interference EIRP for EIRP in an interference zone.

For each Rx point, metrics may be defined as follows. The metrics may represent satisfaction of transmission requirements. For Rx in beam beamIdx, $$MA[rxIdx] = \ln\left(\frac{EIRP[beamIdx][rxIdx]}{reqSIGEIRP[rxIdx]}\right) \quad [3]$$

and $$MB[rxIdx] = \quad [4]$$

$$-\ln\left(\frac{1}{reqINTEIRP[rxIdx]} \sum_{\substack{bldx = beamIdx \\ freq[bldx] = freq[beamIdx]}} EIRP[bIdx][rxIdx]\right).$$

For Rx in interference zone, $MC[rxIdx] =$ [5]

$$-\ln\left(\frac{1}{reqINTEIRP[rxIdx]} \sum_{\substack{bldx \\ freq[bldx] \in freqList[rxIdx]}} EIRP[bIdx][rxIdx]\right).$$

Equations [3], [4], and [5] may be referred to as metric functions. Accordingly, the metric MA may be positive if the signal EIRP exceeds the target signal EIRP and negative if the signal EIRP is less than the target signal EIRP. The metrics MB and MC may be positive when the interference EIRP is less than the target interference EIRP and negative when the interference EIRP exceeds the target interference EIRP.

The HPAs may impose a constraint that for each HPA the power must not exceed the saturation power. Let P[hpaIdx]=saturation power of HPA hpaIdx.

For HPA hpaIdx, the amplifier constraint may be expressed as $$\sum_{beamIdx} |x[hpaIdx][beamIdx]|^2 \leq P[hpaIdx]. \quad [6]$$

This constraint may be used to define the metric MD[hpaIdx] for each HPA as $$MD[hpaIdx] = -\ln\left(\frac{1}{P[hpaIdx]} \sum_{beamIdx} |x[hpaIdx][beamIdx]|^2\right). \quad [7]$$

A positive value of MD[hpaIdx] may indicate that the HPA constraint in equation [7] is satisfied for HPA hpaIdx, and a negative value of MD[hpaIdx] may indicate that the constraint in equation [7] is not satisfied. The overall metric to be maximized may then defined to be a minimum metric function:

METRIC=MIN{MA[rxIdx],MB[rxIdx],MC[rxIdx], MD[hpaIdx]}. [8]

where the minimization is over all Rx points, all HPA's, and all defined metrics. For example, if there are ten HPAs, the METRIC may include ten metric MDs, one for each HPA. If there are 3 beams that each include 100 Rx points, the METRIC may include 300 metric MAs and 300 metric MBs. If there are 10 interference zones (i.e., geographic locations where a maximum EIRP ceiling for a set of frequencies has been identified by the system designer), then the METRIC may include 10 metric MDs. In this example, therefore, evaluating the METRIC may result in selecting the minimum value of the set of values calculated by separately evaluating each of 300 metric MAs, 300 metric MBs, 10 metric MCs and 10 metric MDs.

By defining the METRIC using the ln( ) function, METRIC may be readily converted to a margin in dB by multiplication by 10/ln(10). Whenever the METRIC defined in equation [8] is positive, all design constraints may be met. A negative value for METRIC may indicate that at least one constraint is not met.

Figure 4:
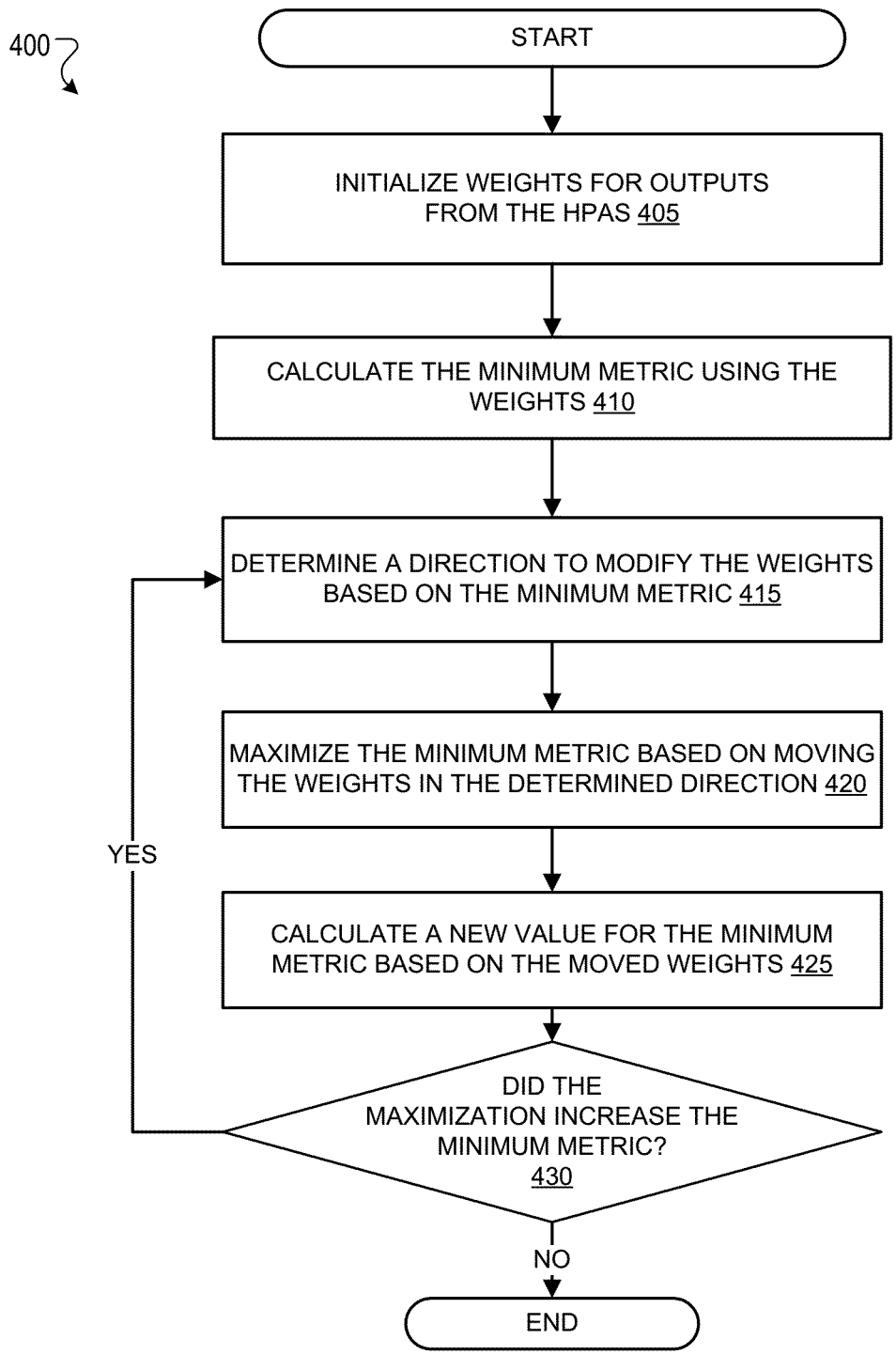
FIG. 4 is a flowchart illustrating an example of a process for determining beam weights.

FIG. 4 is a flowchart illustrating an example of a process 400 for determining beam weights. The gateway 110 may initialize weights for the outputs of the HPAs 215A-215N (405) by setting the values of the weights to initial values. The initial values may be based on the results of conventional beamforming algorithms, default values, or user inputs. For example, the gateway 110 may initialize the weights for the outputs of the HPAs by setting the values of the weights to be HPA beam weights for the HPAs 220A-220N converted from radiating element beam weights for the radiating elements 225A-225N.

The gateway 110 may calculate a minimum metric using the initialized weights (410). The gateway 110 may calculate the minimum metric by calculating the value of each of the metric functions using the initialized weights and taking the minimum value of the values of the metric functions. For example, the gateway 110 may calculate the minimum metric by calculating the result of equation [8] using the values of the initialized weights.

The gateway 110 may determine a direction to modify the weights based on the minimum metric (415). The gateway 110 may determine the direction based on determining a direction that may result in the greatest increase in the minimum metric. The direction may be a vector represented by a direction array with the same dimensions as an array representing the set of HPA beam weights. For example, if the beam weights are a three row by ten column array, the direction may also be a three row by ten column array. The weights may be modified, for example, based on multiplying the direction array by a scalar and adding the result to the set of beam weights.

The gateway 110 may maximize the minimum metric based on moving the weights in the determined direction (420). The gateway 110 may maximize the minimum metric using one-dimensional optimization. The gateway 110 may maximize the minimum metric by, for example, determining the scalar that results in the greatest increase in the minimum metric when the direction array is multiplied by the scalar and added to the set of beam weights. In determining the scalar, the gateway 110 may incrementally change the scalar until the minimum metric no longer increases or directly calculate the scalar that results in the greatest increase.

The gateway 110 may calculate a new value for the minimum metric based on the moved weights (425). The gateway 110 may calculate the new value of the minimum metric similarly to as to how the minimum metric was initially calculated in (410), except the new value of the minimum metric may be calculated using the values of the moved weight instead of the initial values of the weights.

The gateway 110 may determine if the maximization increased the minimum metric (430). If the maximizing increased the minimum metric, further moving the moved weights in a new direction may further increase the minimum metric. Accordingly, the gateway 110 may repeat a portion of the process 400 by returning to (415) to determine another direction to further modify the weights based on the increased minimum metric.

However, if the maximizing did not increase the minimum metric, the minimum metric may already be maximized. Accordingly, the gateway 110 may end the process. If the minimum metric is negative at the end of the process 400, the process 400 may have failed to find values for the weights that satisfy all system design (or transmission) requirements. If the minimum metric is positive at the end of the process 400, the process 400 may have found values for the weights that satisfy all system design (or transmission) requirements.

An example of the process 400 may include generating a minimum metric function with an output representing a metric of a satisfaction of transmission requirements for a satellite communications system configured to produce at least two beams. The minimum metric function may be a function of beam weight parameters. The beam weight parameters may include a first set of beam weight parameters representing output signals of high power amplifiers used to form a first beam and a second set of beam weight parameters representing output signals of high power amplifiers used to form a second beam. The process 400 may also include calculating, using at least one computer processor, an output value of the minimum metric function using initial values for the beam weight parameters and determining a direction to modify the values of the beam weight parameters based on the calculated output value. Additionally, the process 400 may include determining updated values of the beam weight parameters based on maximizing the output value of the minimum metric function by moving the values of the beam weight parameters in the determined direction.

Figure 5:
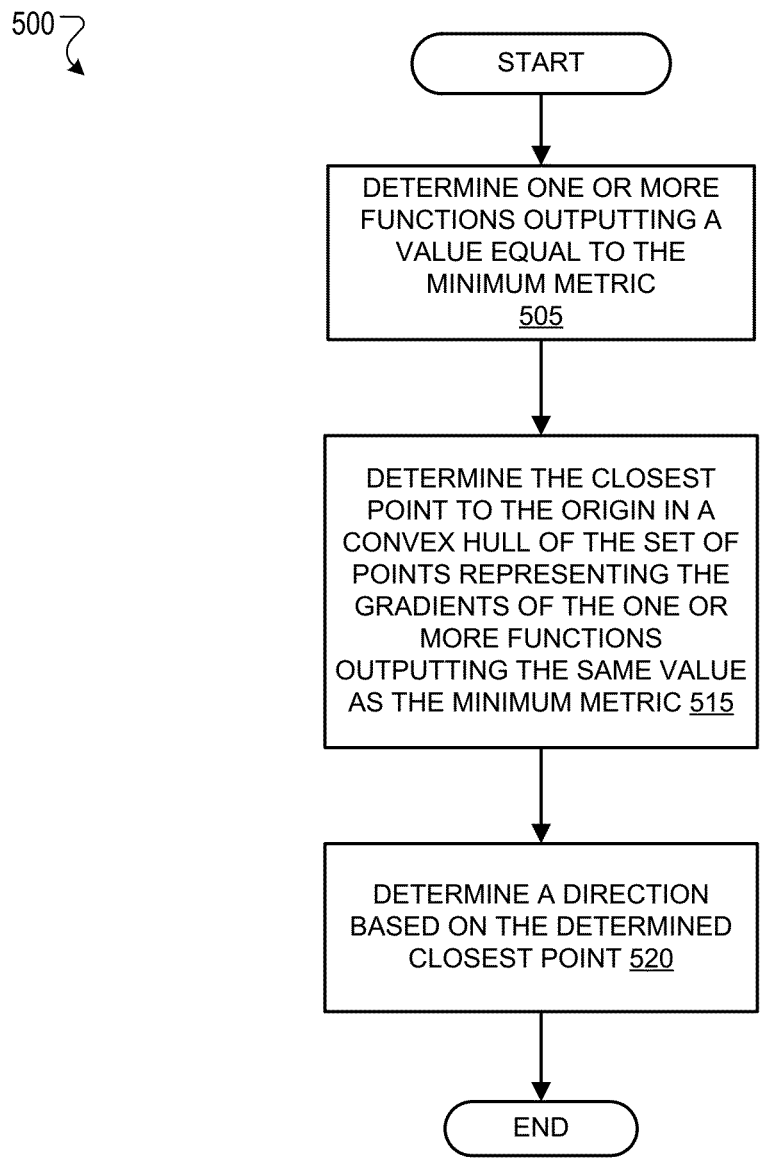
FIG. 5 is a flowchart illustrating an example of a process for determining a direction to move beam weights.

FIG. 5 is a flowchart illustrating an example of a process 500 for determining a direction to move beam weights. As described above in FIG. 4, the direction to move the beam weights may be the direction that results in the greatest increase in the minimum metric. The direction that results in the greatest increase in the minimum metric may be determined based on the gradient of the minimum metric function. The gradient of a scalar field may be a vector field that points in the direction of the greatest rate of increase of the scalar field, and whose magnitude is that rate of increase.

However, the minimum metric function may not be an analytic function with continuous derivatives and a well-defined gradient. For example, equation [8] includes the minimum function and each of the metric functions is further based on an absolute value function. Accordingly, determining the direction that may result in the greatest increase in the minimum metric may be complex.

Instead of using a gradient for the entire minimum metric function to determine the direction that may result in the greatest increase in the minimum metric, the gateway 110 may consider gradients of the functions that make up the minimum metric function. For example, the gateway 110 may consider the gradients of equations [3]-[6]. Each of the functions of the minimum metric function may have a continuous derivative and a well-defined gradient. In the case where functions of the minimum metric function do not have continuous derivatives, e.g., functions including absolute value functions, the functions may be rewritten to be expressed as a function of real and imaginary parts.

The gateway 110 may determine one or more functions outputting a value equal to the minimum metric (505). For example based on equation [8], the gateway 110 may determine that when the minimum metric is 0.1 and there are metric values of 0.1 (from function MA), 0.2 (from function MB), 0.3 (from function MC), and 0.2 (from function MD), the function for MA provided the value of 0.1. The gateway 110 may determine one or more functions outputting a value equal to the minimum metric by comparing the value of the minimum metric to the outputs of the functions.

The gateway 110 may determine the closest point to the origin in a convex hull of the set of points representing the gradients of the one or more functions outputting the same value as the minimum metric (515). A convex hull of a set of points may be the minimal convex set that includes all the set of points. For a set of three points in a plane, the convex hull may be a triangle with vertices as the three points. The triangle as well as all points interior to the triangle may constitute the convex hull. The concept of the convex hull can be applied to higher dimensions.

The gradients of the functions may be plotted as points in a convex hull. As an example, if there are three functions outputting the same value as the minimum metric, the set of points for the convex hull may be the three points represented by the three gradients of the three functions. Accordingly, the one or more gradients of the determined one or more functions outputting the same value as the minimum metric may be analyzed to determine the direction that may increase the minimum metric.

The gateway 110 may determine a direction based on the determined closest point (520). The point in the convex hull closest to the origin may be used to derive the direction. For example, the gateway 110 may calculate the direction from the determined closest point by dividing the closest point by the magnitude of the closest point. Thus, the direction is represented as a unit vector in N-dimensional space, where N is the number of HPA beam weights (e.g., if there are 3 beams and 10 HPAs, N would be equal to 30).

Below is a detailed description regarding gradients with respect to equations [2]-[8]. Equation [8] shows that the minimum metric (METRIC) may be the minimum of a large number of functions. Unfortunately, gradient descent may not be applied directly to METRIC because the MIN function is not analytic. That is, METRIC may not have a smooth derivative as the MIN function switches from the value from one function to the value from another function. However, equations [3], [4], [5], and [7], for MA, MB, MC, and MD functions, respectively, do not have the problem of using MIN. However, the absolute value used to compute EIRP[beamIdx][rxIdx] causes MA, MB, MC, and MD to not be analytic functions of the variables x[hpaIdx][beamIdx] because the absolute value function (for a real or complex variable) does not have a continuous derivative.

However, equation [2] may be rewritten to express the EIRP as a function of the real and imaginary parts of x[hpaIdx][beamIdx].

$$EIRP[beamIdx][rxIdx] = \quad [9]$$

$$\left(\sum_{hpaIdx=0}^{numHPA-1} wr[hpaIdx][rxIdx] * xr[hpaIdx][beamIdx] - \atop wi[hpaIdx][rxIdx] * xi[hpaIdx][beamIdx]\right)^2$$

$$\left(\sum_{hpaIdx=0}^{numHPA-1} wr[hpaIdx][rxIdx] * xi[hpaIdx][beamIdx] + \atop wi[hpaIdx][rxIdx] * xr[hpaIdx][beamIdx]\right)^2$$

$$wr[hpaIdx][rxIdx] = Re\{w[hpaIdx][rxIdx]\}, \quad [10]$$

$$wi[hpaIdx][rxIdx] = Im\{w[hpaIdx][rxIdx]\}, \quad [11]$$

$$xr[hpaIdx][rxIdx] = Re\{x[hpaIdx][rxIdx]\}, \quad [12]$$

$$xi[hpaIdx][rxIdx] = Im\{x[hpaIdx][rxIdx]\}, \quad [13]$$

Now MA, MB, and MC are all analytic functions of the variables xr[hpaIdx][rxIdx] and xi[hpaIdx][rxIdx], and all partial derivatives can be computed to form a gradient. The partial derivatives of EIRP as shown in equation [9] may be given by:

$$\frac{\partial EIRP[beamIdx][rxIdx]}{\partial xr[hpaIdx][beamIdx]} = \quad [20]$$
$$2Re\{R[beamIdx][rxIdx]w^*[hpaIdx][beamIdx]\}.$$
and $$\frac{\partial EIRP[beamIdx][rxIdx]}{\partial xi[hpaIdx][beamIdx]} = \quad [21]$$
$$2Im\{R[beamIdx][rxIdx]w^*[hpaIdx][beamIdx]\}$$

The partial derivatives for MA[rxIdx], MB[rxIdx], and MC[rxIdx] can be computed to be:

$$\frac{\partial MA[rxIdx]}{\partial rx[hpaIdx][beamIdx]} = \quad [22]$$
$$\frac{1}{EIRP[beamIdx][rxIdx]} \cdot \frac{\partial EIRP[beamIdx][rxIdx]}{\partial xr[hpaIdx][beamIdx]},$$

$$\frac{\partial MA[rxIdx]}{\partial xi[hpaIdx][beamIdx]} = \quad [23]$$
$$\frac{1}{EIRP[beamIdx][rxIdx]} \cdot \frac{\partial EIRP[beamIdx][rxIdx]}{\partial xi[hpaIdx][beamIdx]},$$

$$\frac{\partial MB[rxIdx]}{\partial xr[hpaIdx][bIdx]} = \quad [24]$$
$$\begin{cases} \dfrac{1}{\sum\limits_{\substack{b \neq beamIdx \\ freq[b]=freq[beamIdx]}} EIRP[bIDX][rxIdx]} \cdot \dfrac{\partial EIRP[bIdx][rxIdx]}{\partial xr[hpaIdx][bIdx]} \\ \quad \text{for } bIdx \neq beamIdx \text{ and } freq[bIdx] = freq[beamIdx] \\ 0 \quad \text{else} \end{cases}$$

$$\frac{\partial MB[rxIdx]}{\partial xi[hpaIdx][bIdx]} = \quad [25]$$
$$\begin{cases} \dfrac{1}{\sum\limits_{\substack{b \neq beamIdx \\ freq[b]=freq[beamIdx]}} EIRP[bIdx][rxIdx]} \cdot \dfrac{\partial EIRP[bIdx][rxIdx]}{\partial xi[hpaIdx][bIdx]} \\ \quad \text{for } bIdx \neq beamIdx \text{ and } freq[bIdx] = freq[beamIdx] \\ 0 \quad \text{else} \end{cases}$$

$$\frac{\partial MC[rxIdx]}{\partial xr[hpaIdx][bIdx]} = \quad [26]$$
$$\begin{cases} \dfrac{1}{\sum\limits_{freq[b] \in freqList[rxIdx]} EIRP[b][rxIdx]} \cdot \dfrac{\partial EIRP[bIdx][rxIdx]}{\partial xr[hpaIdx][bIdx]} \\ \quad \text{for } freq[bIdx] \in freqList[rxIdx] \\ 0 \quad \text{else} \end{cases}$$

$$\frac{\partial MC[rxIdx]}{\partial xi[hpaIdx][bIdx]} = \quad [27]$$
$$\begin{cases} \dfrac{1}{\sum\limits_{freq[b] \in freqList[rxIdx]} EIRP[b][rxIdx]} \cdot \dfrac{\partial EIRP[bIdx][rxIdx]}{\partial xi[hpaIdx][bIdx]} \\ \quad \text{for } freq[bIdx] \in freqList[rxIdx] \\ 0 \quad \text{else} \end{cases}$$

In the case where the variables x[hpaIdx][rIdx] are set to values for which there is one single metric function that is less than all the others and all HPA's are driven below saturation, the value of this one single metric function is then selected by the MIN function, and moving (at least incrementally) in the direction of the gradient of this metric function may increase METRIC.

However, when the variables x[hpaIdx][rIdx] are set to values for which there are two metric functions that are equal to each other and less than all the others and all HPAs are driven below saturation, the value of these two metric functions is then selected by the MIN function. Each of these two metric functions has a corresponding gradient, referred to as $g_0$ and $g_1$. Moving in a direction d, where d·d=1, the first metric will increase at the rate $g_0$·d and the second metric will increase at the rate $g_1$·d. The overall metric METRIC will then increase at a rate which is the minimum of $g_0$·d and $g_1$·d. If this rate of increase in METRIC is not positive, then moving in direction d will not increase METRIC. If no d exists for which $g_0$·d and $g_1$·d are both positive, there is no direction to move that will increase METRIC (at least not incrementally, METRIC may be stuck at a local maxima).

The problem of determining the direction to move that will give the maximum rate of increase in METRIC is then equivalent to the problem, given arbitrary vectors $g_0$ and $g_1$, determine the vector d that maximizes MIN $\{g_0 \cdot d, g_1 \cdot d\}$ under the constraints d·d=1, $g_0$·d>0, and $g_1$·d>0. In general, when there are N metrics in equation [8] that equal the minimum value, this problem is equivalent to determining the vector d that maximizes MIN $\{g_0 \cdot d, g_1 \cdot d, g_{N-1} \cdot d\}$ under the constraints d·d=1, and $g_i$·d>0, for i∈[0, N−1].

However, the problem of having to consider multiple metric functions may be solved based on the following. Given N vectors $g_0, g_1, g_{n-1}$, a feasible solution may be a vector d that satisfies d·d=1, and $g_i$·d>0, for i∈[0, N−1]. A feasible solution may exist if and only if the convex hull of the points $g_0, g_1, \ldots, g_{N-1}$ does not contain the origin. Furthermore, if a feasible solution exists, the vector d that maximizes MIN $\{g_0 \cdot d, g_1 \cdot d, g_{N-1} \cdot d\}$ subject to the constraint d·d=1 may be given by d=u/‖u‖ where u is the point in the convex hull of the points $g_0, g_1, \ldots, g_{N-1}$ that is closest to the origin.

Figure 6:
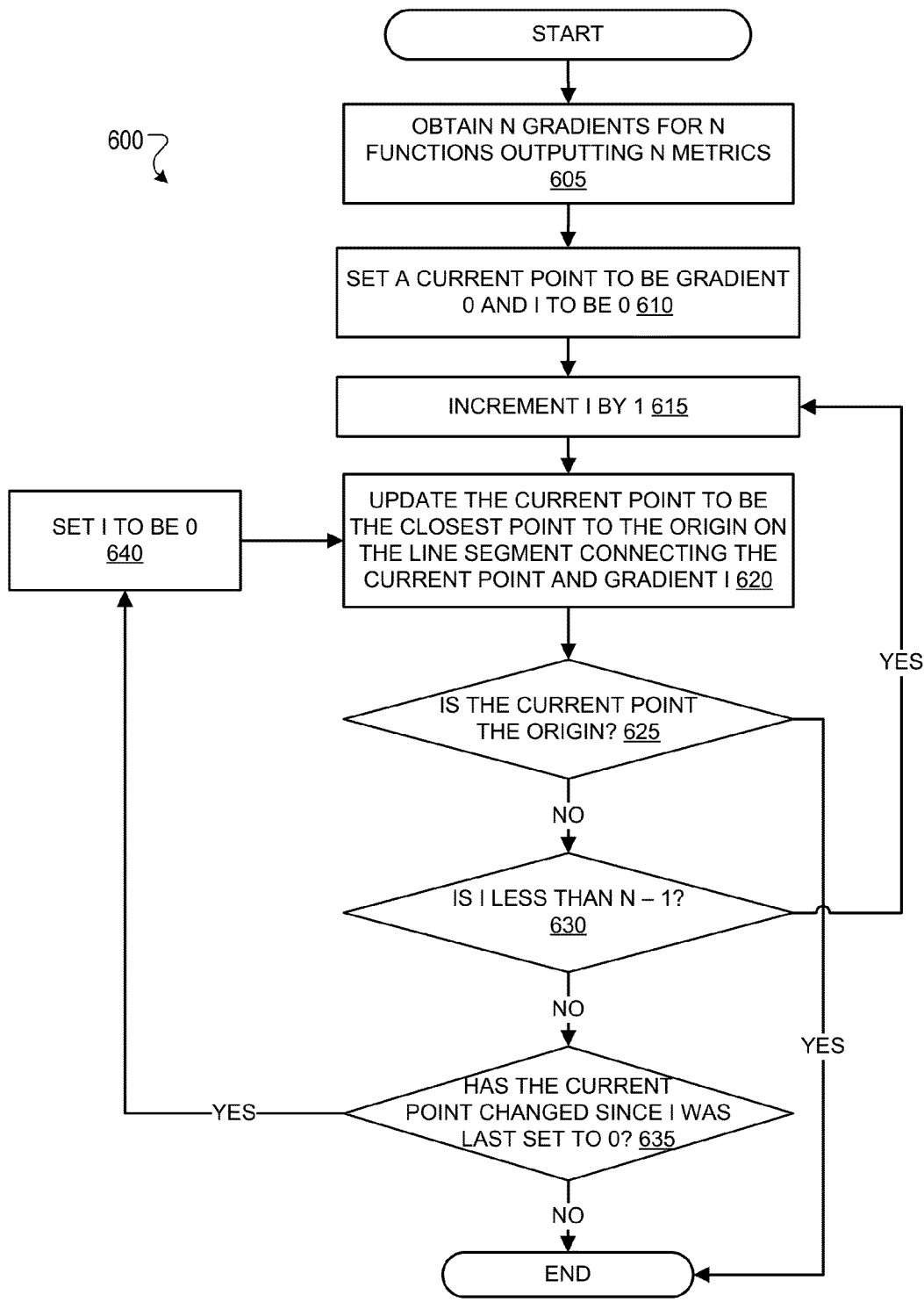
FIG. 6 is a flowchart illustrating an example of a process for determining a point closest to the origin in a convex hull of a set of points.

FIG. 6 is a flowchart illustrating an example of a process 600 for determining a point closest to the origin in a convex hull of points. The problem of finding the point closest to the origin in the convex hull of a set of points can be formulated as a nonlinear programming problem and could be solved using nonlinear programming techniques, most notably the Frank-Wolfe algorithm. However, a non-linear programming technique may also be used. The process 600 may be an iterative non-linear programming technique for finding the point closest to the origin in a convex hull of points. The process 600 may be used in the process 500 where the convex hull of points in the process 600 is made of the gradients of the functions outputting the same value as the minimum metric.

The process 600 may include obtaining N gradients for N functions outputting N metrics (605). For example, the gateway 110 may receive an indication that the gradient of three functions should be used as the points in a convex hull. The gateway 110 may calculate the gradients for these three functions using a given set of beam weights. The first gradient may be considered gradient zero, the second gradient may be considered gradient one, and the N-th gradient may be gradient N−1.

The gateway 110 may set a current point to be gradient zero and i to be zero (610). Setting the current point to be gradient zero and i to be zero may initialize values for the current point and i.

The gateway 110 may increment i by one (615). For example, if i is equal to zero, i may be set to one.

The gateway 110 may update the current point to be the closest point to the origin on the line segment connecting the current point and the point representing gradient i (620). For example, if the current point is set to gradient zero and i is one, then the current point may be updated to be the closest point to the origin on the line segment connecting a point corresponding to gradient zero and a point corresponding to gradient one. If the line segment crosses the origin, then the closest point to the origin will be the origin.

The gateway 110 may determine if the current point is the origin (625). If the current point is the origin, this may indicate that there is no direction to move the weights that will result in the minimum metric increasing. Accordingly, if the current point is the origin, the process 600 may end.

If the current point is not the origin, the process 600 may continue to determine if i is less than N−1 (630). If i is less than N−1, this may mean that not all gradients have been analyzed by connecting them with a line segment. Accordingly, if i is less than N−1, a portion of the process 600 may repeat by returning to (615) to increment i by one. For example, if i is one and N is three, the process 600 may repeat to (615) to increment i to two.

If i is not less than N−1, the process 600 may determine if the current point has changed since i was last set to 0 (635). If i has not changed since i was last set to zero, this may indicate that there is no closer point to the origin in the convex hull. Accordingly, the process 600 may end. If i has changed since i was set to zero, i may be set to zero again and the current point may be updated again (620).

An example of the process 600 may include setting a current point to be a first gradient and iteratively updating the current point to be the closest point to the origin on a line segment between the current point and a gradient of a metric function until the current point no longer changes.

An example algorithm based on the process 600 is shown below:

Given $g_0, g_1, \ldots, g_{N-1}$
(1) Initialize $u=g_0$, $i=0$.
(2) Increment: $i=i+1$.
(3) Set u to be the point on the line segment that connects u and $g_i$ that is closest to the origin.
(4) If u=0, stop, no feasible solution exists.
(5) If i<N−1, go to (2).
(6) Check convergence: If after cycling through all the $g_i$, u remains unchanged STOP, otherwise set i=0, and go to (3).

Figure 7:
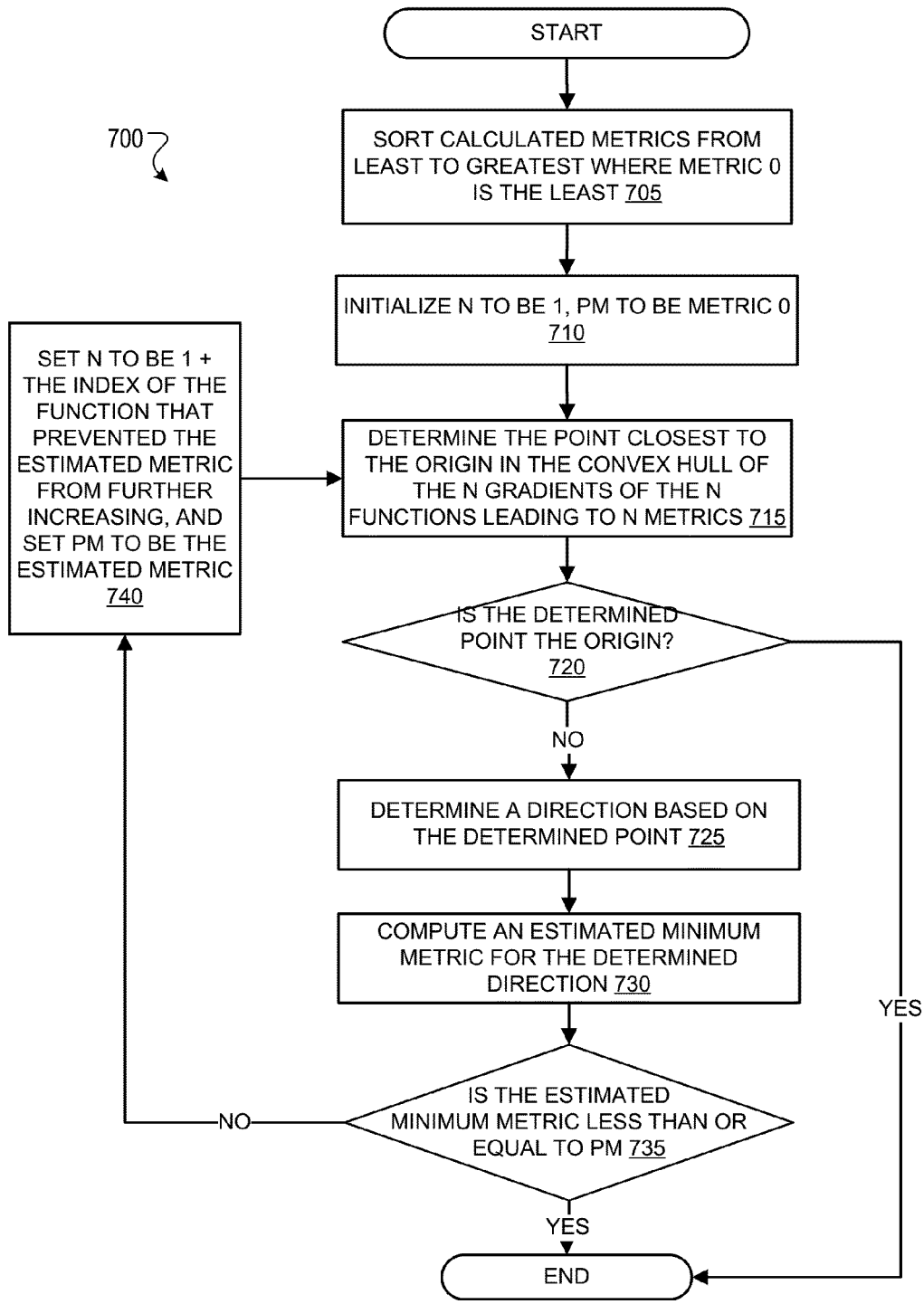
FIG. 7 is a flowchart illustrating an example alternative process for determining a direction to move beam weights.

FIG. 7 is a flowchart illustrating an example alternative process 700 for determining a direction to move beam weights. The process 700 may be an alternate process to the process 500 and may be more efficient than the process 500. In particular, the process 700 may more efficiently handle circumstances where the value of the minimum metric function is very close, but not identical to, the value of a metric function. For example, the value of the minimum metric function may be 0.001 and the value of the metric function may be 0.001001. In the circumstance where the value of the metric function is not identical to the value of the minimum metric function, the metric function may be ignored when determining the direction even though taking the metric function into consideration when determining the direction may result in determining a direction that results in the greatest increase in the minimum metric.

The gateway 110 may sort the values of the calculated metrics from least to greatest where metric zero is the least metric (705). For example, N values for calculated metrics may be sorted so that metric zero is the lowest value and metric N−1 is the highest value. For calculated metrics that have the same value, the calculated metrics may be arbitrarily ordered relative to the calculated metrics that have the same value. For example, metric values of 0.1 (from function MA), 0.2 (from function MB), 0.3 (from function MC), and 0.2 (from function MD), may be ordered as 0.1 (from function MA), 0.2 (from function MB), 0.2 (from function MD), and 0.3 (from function MC) or ordered as 0.1 (from function MA), 0.2 (from function MD), 0.2 (from function MB), and 0.3 (from function MC).

The gateway 110 may initialize N to be 1 and pm to be the value of metric zero (710). N may represent the number of gradients minus one in the set of points in the convex hull. pm may represent the previous value of the minimum metric.

The gateway 110 may determine the point closest to the origin in the convex hull of the N gradients of the N functions leading to N metrics (715). For example, the gateway 110 may determine the point closest to the origin using the process 600, where the N gradients in the process 600 are the N gradients in the process 700.

The gateway 110 may determine if the determined closest point is the origin (720). When the determined closest point is the origin, this may mean that there is no direction that results in an increase in the minimum metric. Accordingly, if the determined closest point is the origin, the process 700 may end.

If the determined closest point is not the origin, the gateway 110 may determine a direction based on the determined closest point (725). For example, the gateway 110 may determine the direction by dividing the determined closest point by the magnitude of the closest point.

The gateway 110 may compute an estimated minimum metric for the determined direction (730). The gateway 110 may compute the estimated minimum metric based on finding the distance in the determined direction when the minimum dot product of the dot products of the gradients of the metric functions and the direction is maximized. The dot products of more than the first N metric functions may be considered. For example, the dot products of the first N*2 of the metric functions and the direction may be considered.

The gateway 110 may determine if the estimated minimum metric is less than or equal to pm (735). If the estimated minimum metric is less than or equal to pm, then moving in the determined direction may not further increase the minimum metric. Accordingly, the minimum metric may be considered to have been already maximized without moving in the newly determined direction. Therefore, the process 700 may end.

If the estimated minimum metric is greater than pm, then the gateway 110 may set N to be one plus the index of the metric function that prevented the estimated metric from further increasing and setting pm to be the estimated metric (740). The gateway 110 may then repeat a portion of the process 700 by returning to (715) to determine the point closest to the origin in the new convex hull of the N gradients of the N functions leading to the N metrics.

Figure 8:
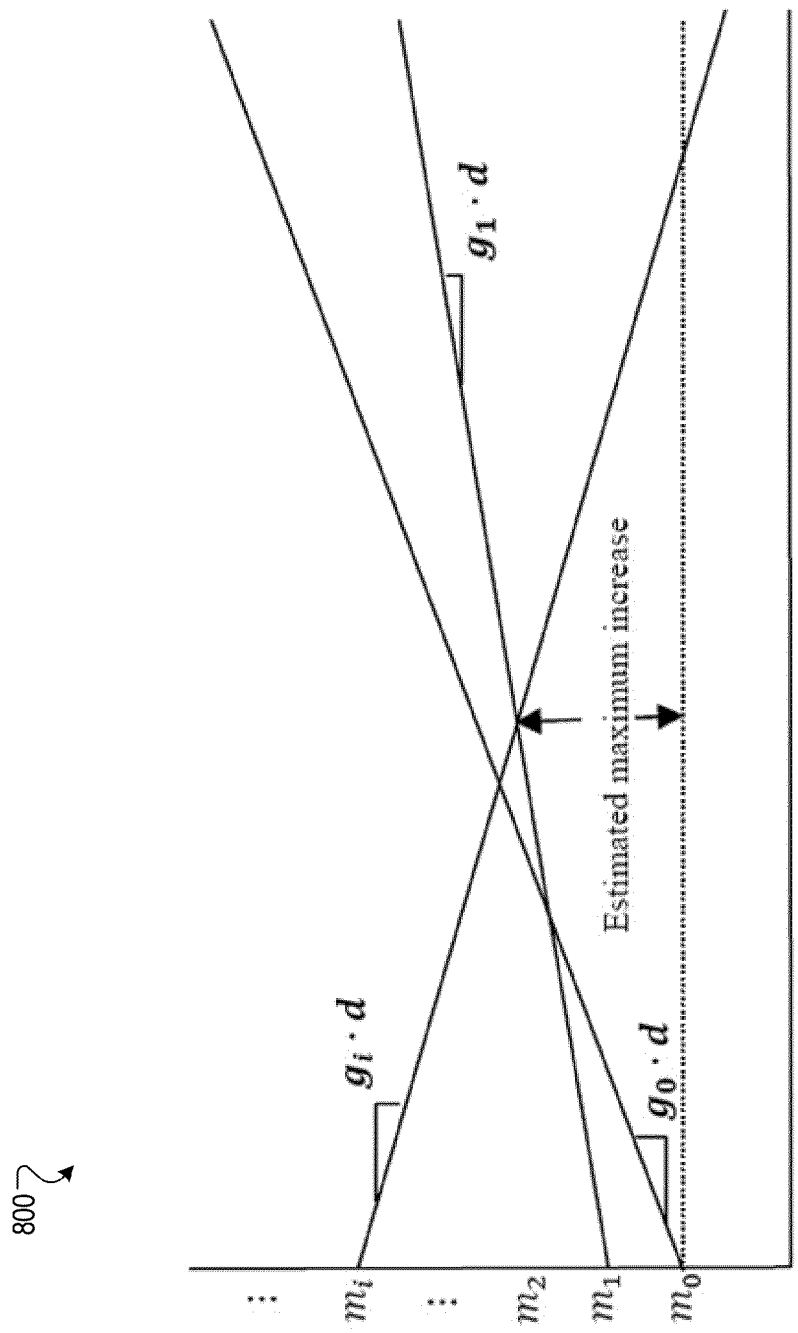
FIG. 8 is a graph illustrating the dot products of gradients of metric functions and a direction.

An example of the process 700 may be,
(1) Initialize: N=1, pm=$m_0$
(2) Compute: u=point in the convex hull of the points g0, g1, ..., $g_{N-1}$ that is closest to the origin
(3) If u=0, STOP and use d from previous iteration, if this is the first iteration no feasible d.
(4) d=u/∥u∥
(5) Compute: m=estimated METRIC for direction d as illustrated in FIG. 8.
(6) If m<=pm STOP and use d from previous iteration.
(7) Set N=1+index of the ($m_i$, $g_i$) that prevented the estimated metric from further increasing (index i in the above figure), and set pm=m.
(8) Iterate: go to (2)

While the processes 400, 500, 600, and 700 are described as being performed by the gateway 110 in the system 100, the processes 400, 500, 600, and 700 may be performed by the gateways 110 or 125, the satellite 105, or a combination.

FIG. 8 is a graph 800 illustrating the dot product of gradients of metrics with a direction as movement in the direction increases. The x-axis of the graph may represent the amount of movement in the d direction and the y-axis may represent the dot product of the gradients and the d direction. The dot product of the gradients and the d direction may be charted as lines for each metric function. As seen in the graph 800, the amount of movement in the d direction that maximizes the minimum dot product may be a point of intersection of the lines represented by the dot products. Determining the gradients that correspond to the intersecting of the dot products may also help determine one or more metric functions that prevented the estimated metric from further increasing.

There are a number of further generalizations and extensions that may be incorporated into the algorithm. When setting the target EIRP values, each Rx point may specify values independently. Accordingly, the transmission requirements may specify interference zones to have a maximum power density (W/m2) as opposed to a maximum EIRP. Alternatively, the transmission requirements may specify a conus or other large coverage beam where the metric is defined to maximize the minimum power density over the beam, as opposed to the minimum EIRP. The transmission requirements may also allow each HPA to have an independently specified saturation power. For example, the satellite 105 may have two radiating elements that are dedicated beams for Hawaii and Puerto Rico which share HPA's with all the other beams. The process 300 may be used to create the other beams in the system in the presence of power transmitted to Hawaii and Puerto Rico. This may be done by computing the power in each HPA for Hawaii and PR, then for each HPA, setting the saturation power to the remaining power the HPA can transmit before saturation. For example, if a particular 100 W HPA is computed as transmitting 30 W to Hawaii and Puerto Rico, then this HPA may have 70 W available to form the other beams so its saturation power may be set to 70 W.

The process 300 may also be used to optimize beam weights. For example, the transmission requirements may be variable constraints that may be maximized. The transmission requirements can be initialized to known achievable values and the process 300 run until the minimum metric function. Then the transmission requirements may be slightly increased and the previously calculated HPA beam weights used as the initial HPA beam weights for the increased requirements. Accordingly, the transmission requirements may be iteratively increased until the minimum metric function is not positive, in which case the most previous transmission requirements may represent the maximum transmission requirements that may be satisfied.

For example, it may be desirable to maximize the signal EIRP for each beam so that transmission requirements for the signal EIRP may be iteratively increased until the minimum metric function is negative so that the previous iteration with a positive minimum metric function represents maximization of the signal EIRP into each beam.

The concept of iteratively adjusting requirements may be used for a wide variety of optimization strategies including maximizing of signal EIRP in all beams, maximizing of signal EIRP over a selected subset of beams, minimizing of co-channel interference over all or a select subset of beams, and minimizing of interference into arbitrarily defined interference regions.

The HPA beam weights may also be represented as polar coordinates instead of rectangular coordinates. For example, xr and xi in equations [12] and [13] may use polar coordinates and be defined as $$xr[\text{hpaIdx}][\text{beamIdx}]=\text{amp}[\text{hpaIdx}][\text{beamIdx}] \cos(phs[\text{hpaIdx}][\text{beamIdx}]),$$

$$xi[\text{hpaIdx}][\text{beamIdx}]=\text{amp}[\text{hpaIdx}][\text{beamIdx}] \sin(phs[\text{hpaIdx}][\text{beamIdx}]),$$

where amp is the beam weight amplitude and phs is the beam weight phase for a given HPA and a given beam.

With respect to gradient calculations, given an function f(xr, xi), where xr=A*cos θ, and xi=A*sin θ

$$\frac{\partial f}{\partial A} = \frac{\partial f}{\partial xr}\cos\theta + \frac{\partial f}{\partial xi}\sin\theta, \qquad [14]$$

and $$\frac{\partial f}{\partial \theta} = A\left(-\frac{\partial f}{\partial xr}\sin\theta + \frac{\partial f}{\partial xi}\cos\theta\right). \qquad [15]$$

Further, for some applications, the power transmitted into each beam may be a fixed constant. The fixed constant may be used as a constraint in the process 300. For example, let $$PB[\text{beamIdx}]=\text{fixed power to beam beamIdx}.$$

Optimization is then subject to the constraint that $$\sum_{hpaIdx} |x[hpaIdx][beamIdx]|^2 = PB[beamIdx]. \qquad [16]$$

In order to incorporate these constraints into the algorithm, the first step may be to express the beam weights using polar coordinates. As the fixed power constraint only involves the beam weight amplitudes, amp[hpaIdx][beamIdx], the constraint may be satisfied when:

$$\sum_{hpaIdx} (amp[hpaIdx][beamIdx])^2 = PB[beamIdx]. \quad [17]$$

A change of variables, referred to here as a binary phase transformation, may be defined. The change of variables may extend the concept of polar coordinates and spherical coordinates to arbitrarily higher dimensions such that the constraints in equation [17] are satisfied by construction of the variables used for the beam weights. For example, given eight HPA's and a single beam referenced by beamIdx=0, the eight beam weight amplitudes are represented as $$amp[0][0]=PB[0]C_1C_2C_4$$

$$amp[1][0]=PB[0]C_1C_2C_4$$

$$amp[2][0]=PB[0]C_1C_2C_5$$

$$amp[3][0]=PB[0]C_1C_2C_5$$

$$amp[4][0]=PB[0]S_1C_2C_6$$

$$amp[5][0]=PB[0]S_1C_2C_6$$

$$amp[6][0]=PB[0]S_1S_2C_7$$

$$amp[7][0]=PB[0]S_1S_2C_7 \quad [18]$$

where $$C_i=\cos(phi[i][0]).$$

$$S_i=\sin(phi[i][0]). \quad [19]$$

The eight amplitude variables have been replaced by seven phases, and also that equation [17] is satisfied by construction from the properties of the sine and cosine functions. Also, since the amplitude variables amp[hpaIdx][beamIdx] must be >=0, each of the phases, phi[i][beamIdx], lies in the interval[0, π/2].

This transformation can be applied to arbitrary number of HPAs. Partial derivatives for each element in equation [18] may be computed and used to transform gradients from the space of amp[hpaIdx][beamIdx] into phi[i][beamIdx].

The disclosed and other examples can be implemented as one or more computer program products, i.e., one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for beamforming in a satellite communications network, the method comprising:

generating, using at least one computer processor, a minimum metric function with an output representing a metric of a satisfaction of transmission requirements for a satellite communications system configured to produce at least two beams, the minimum metric function being a function of beam weight parameters, the beam weight parameters including a first set of beam weight parameters representing amplitudes and phases of output signals at high power amplifiers used to form a first beam and a second set of beam weight parameters representing output signals at high power amplifiers used to form a second beam;

calculating, using the at least one computer processor, an output value of the minimum metric function using initial values for the beam weight parameters that represent amplitudes and phases of output signals at high power amplifiers;

determining, using the at least one computer processor, a direction to modify the values of the beam weight parameters that represent amplitudes and phases of output signals at high power amplifiers based on the calculated output value;

determining, using the at least one computer processor, updated values of the beam weight parameters that represent amplitudes and phases of output signals at high power amplifiers based on maximizing the output value of the minimum metric function by moving the values of the beam weight parameters in the determined direction; and providing, using the at least one computer processor, information to a satellite that enables the satellite generate the first beam and the second beam, where the information is based on the updated values of the beam weight parameters that represent amplitudes and phases of output signals at high power amplifiers.

2. The method of claim 1, further comprising:
modifying one or more signals for forming beams based on the updated values of the beam weight parameters.

3. The method of claim 1, further comprising:
calculating a second output value of the minimum metric function using the updated values of the beam weight parameters;
determining a second direction based on the calculated second output value; and
determining further updated values of the beam weight parameters based on maximizing the output value of the minimum metric function by moving the updated values of the beam weight parameters in the determined second direction.

4. The method of claim 1, wherein the transmission requirements comprise at least one of:
a required minimum equivalent isotropically radiated power (EIRP), a required maximum co-channel interference EIRP for a beam, a required maximum interference EIRP for an interference zone, or a saturation power of a high power amplifier.

5. The method of claim 1, wherein the minimum metric function comprises a minimum value from values of metric functions, where each of the metric functions represent metrics of satisfaction of the transmission requirements.

6. The method of claim 5, wherein determining the direction to modify the values comprises:

determining the closest point to the origin in a convex hull of a set of points representing gradients of the metric functions; and
determining the direction based on the determined closest point.

7. The method of claim 6, wherein determining the closest point comprises setting a current point to be a first gradient and iteratively updating the current point to be the closest point to the origin on a line segment between the current point and a gradient of the gradients of the metric functions.

8. The method of claim 5, wherein determining the direction comprises determining the closest point to the origin in a convex hull of a set of points representing gradients of the metric functions, determining a potential direction based on the determined closest point, estimating the output of the minimum metric function based on the potential direction, determining one or more additional gradients of metric functions limiting the maximization of the minimum metric function, determining another closest point to the origin in a convex hull of a set of points representing the gradients of the metric functions and the one or more additional gradients, and determining the direction based on the another closest point.

9. The method of claim 1, further comprising iteratively adjusting the transmission requirements using previously determined values of the beam weight parameters as the initial values of the beam weight parameters for subsequent iterations.

10. The method of claim 1, wherein the beam weight parameters are represented in polar coordinates.

11. A non-transitory computer-readable storage medium encoding one or more instructions for execution by a processor, the one or more instructions when executed by the processor operable to:

generate, using the processor, a minimum metric function with an output representing a metric of a satisfaction of transmission requirements for a satellite communications system configured to produce at least two beams, the minimum metric function being a function of beam weight parameters, the beam weight parameters including a first set of beam weight parameters representing amplitudes and phases of output signals at high power amplifiers used to form a first beam and a second set of beam weight parameters representing output signals at high power amplifiers used to form a second beam;

calculate, using the processor, an output value of the minimum metric function using initial values for the beam weight parameters that represent amplitudes and phases of output signals at high power amplifiers;

determine, using the processor, a direction to modify the values of the beam weight parameters that represent amplitudes and phases of output signals at high power amplifiers based on the calculated output value; and determine, using the processor, updated values of the beam weight parameters that represent amplitudes and phases of output signals at high power amplifiers based on maximizing the output value of the minimum metric function by moving the values of the beam weight parameters in the determined direction; and provide, using the processor, information to a satellite that enables the satellite generate the first beam and the second beam, where the information is based on the updated values of the beam weight parameters that represent amplitudes and phases of output signals at high power amplifiers.

12. The system of claim 11, wherein the one or more instructions when executed by the processor are further operable to:

modify one or more signals for forming beams based on the updated values of the beam weight parameters.

13. The system of claim 11, wherein the one or more instructions when executed by the processor are further operable to:
   calculate a second output value of the minimum metric function using the updated values of the beam weight parameters;
   determine a second direction based on the calculated second output value; and
   determine further updated values of the beam weight parameters based on maximizing the output value of the minimum metric function by moving the updated values of the beam weight parameters in the determined second direction.

14. The system of claim 11, wherein the transmission requirements comprise at least one of:
   a required minimum equivalent isotropically radiated power (EIRP), a required maximum co-channel interference EIRP for a beam, a required maximum interference EIRP for an interference zone, or a saturation power of a high power amplifier.

15. The system of claim 11, wherein the minimum metric function comprises a minimum value from values of metric functions, where each of the metric functions represent metrics of satisfaction of the transmission requirements.

16. The system of claim 15, wherein determine the direction to modify the values comprises:
   determine the closest point to the origin in a convex hull of a set of points representing gradients of the metric functions; and
   determine the direction based on the determined closest point.

17. The system of claim 16, wherein determine the closest point comprises set a current point to be a first gradient and iteratively update the current point to be the closest point to the origin on a line segment between the current point and a gradient of the gradients of the metric functions.

18. The system of claim 15, wherein determine the direction comprises determine the closest point to the origin in a convex hull of a set of points representing gradients of the metric functions, determine a potential direction based on the determined closest point, estimate the output of the minimum metric function based on the potential direction, determine one or more additional gradients of metric functions limiting the maximization of the minimum metric function, determine another closest point to the origin in a convex hull of a set of points representing the gradients of the metric functions and the one or more additional gradients, and determine the direction based on the another closest point.

19. The system of claim 11, wherein the one or more instructions when executed by the processor are further operable to iteratively adjust the transmission requirements using previously determined values of the beam weight parameters as the initial values of the beam weight parameters for subsequent iterations.

20. The system of claim 11, wherein the beam weight parameters are represented in polar coordinates.

21. A method for beamforming in a satellite communications network, the method comprising:
   determining, using a computer processor, values for a first set of beam weight parameters that indicate the amplitude and phase of signals outputted by high power amplifiers in a satellite to form a first beam and values for a second set of beam weight parameters that indicate the amplitude and phase of signals outputted by the high power amplifiers in the satellite to form a second beam; and
   providing information to the satellite that enables the satellite to form the first beam based on the determined values for the first set of beam weight parameters and the second beam based on the determined values for the second set of beam weight parameters,
   wherein determining the values for the first set of beam weight parameters and the values for the second set of beam weight parameters includes evaluating a mathematical function that includes the first set of beam weight parameters, the second set of beam weight parameters, and one or more parameters indicating saturation power limits of the high power amplifiers.

22. The method of claim 21, wherein evaluating the function comprises iteratively evaluating the function by changing interim values for the first set of beam weight parameters and interim values for the second set of beam weight parameters in each iteration.

23. The method of claim 22, wherein iteratively evaluating the function by changing interim values for the first set of beam weight parameters and interim values for the second set of beam weight parameters in each iteration comprises determining a change for the interim values for the first set of beam weight parameters and the interim values for the second set of beam weight parameters during each iteration while using the one or more parameters indicating saturation power limits of the high power amplifiers as a constraint.

24. The method of claim 23, wherein determining the change comprises determining a change in the interim values for the first set of beam weight parameters and the interim values for the second set of beam weight parameters that increases an output of the mathematical function.

\* \* \* \* \*